Oct. 28, 1952

J. T. CROWDER 2,615,462

CENTRIFUGAL GOVERNOR HAVING A SERIES OF RADIALLY
SHIFTABLE, MOTION TRANSMITTING BELL CRANK LEVERS

Filed Sept. 13, 1946

INVENTOR
JAMES T. CROWDER

ATTORNEYS

Oct. 28, 1952 J. T. CROWDER 2,615,462
CENTRIFUGAL GOVERNOR HAVING A SERIES OF RADIALLY
SHIFTABLE, MOTION TRANSMITTING BELL CRANK LEVERS
Filed Sept. 13, 1946 2 SHEETS—SHEET 2

INVENTOR
JAMES T. CROWDER

ATTORNEYS

Patented Oct. 28, 1952

2,615,462

UNITED STATES PATENT OFFICE 2,615,462

CENTRIFUGAL GOVERNOR HAVING A SERIES OF RADIALLY SHIFTABLE, MOTION TRANSMITTING BELL CRANK LEVERS

James T. Crowder, Dallas, Tex.

Application September 13, 1946, Serial No. 696,655

1 Claim. (Cl. 137—56)

This invention relates to power transmission structures for vehicles and more particularly to a centrifugal governor, provided with a series of radially shiftable, motion transmitting bell crank levers, for a vehicle transmission of the hydraulic type.

A main object of the invention is to provide a novel and improved centrifugal governor structure for vehicles, said structure being relatively simple, efficient in operation and reliable in performance.

A further object of the invention is to provide an improved governor to be associated with a fluid transmission for vehicles which is inexpensive to manufacture, easy to maintain and which permits the engine of the vehicle to come up to speed without undue drag thereon, the mechanism functioning automatically to apply the load when the engine has reached its optimum working speed.

Further objects and advantages of the invention will become apparent from the following description and claim, and from the accompanying drawings, wherein:

Figure 1:
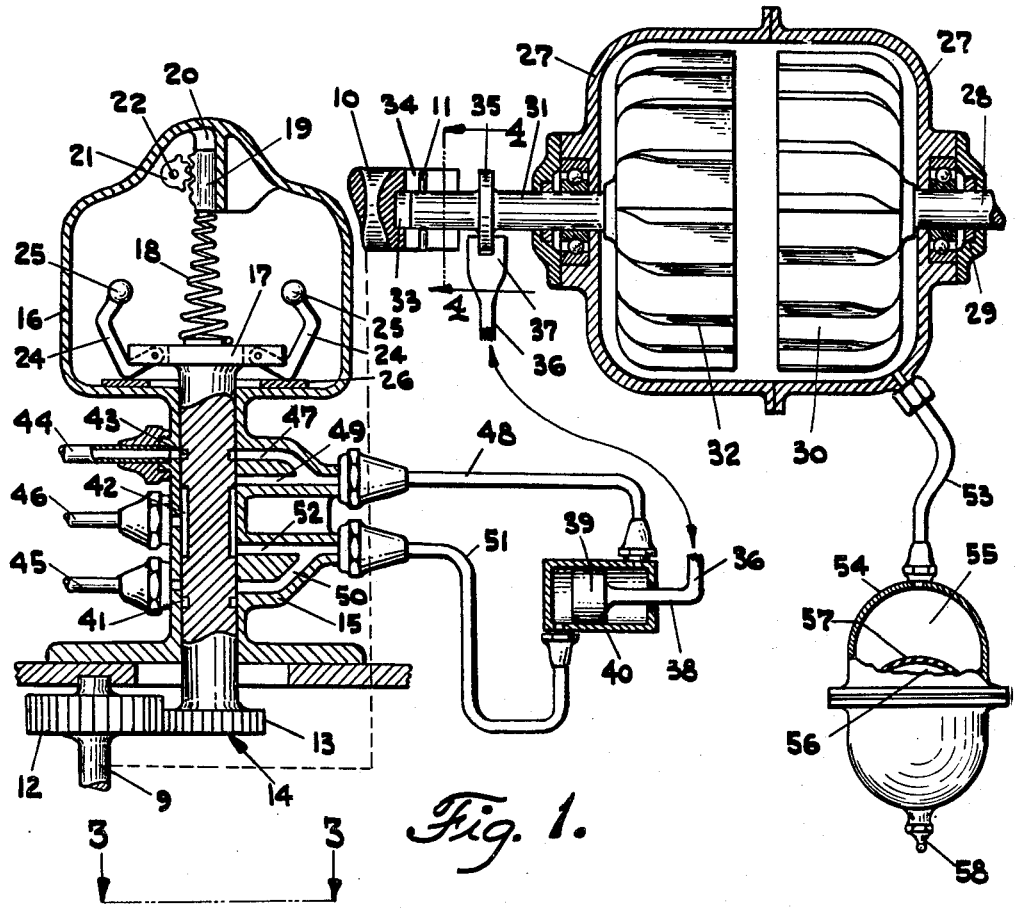
Figure 1 is a cross-sectional schematic view illustrating a governor and vehicle fluid drive structure according to the present invention, the parts being shown in positions corresponding to low or idling speed of the engine.
Figure 2:
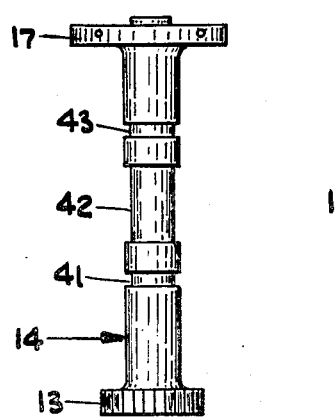
Figure 2 is an elevational detail view of a main rotor member employed in the structure illustrated in Figure 1.
Figure 3:
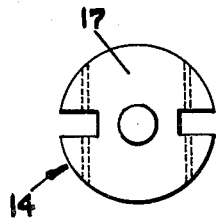
Figure 3 is an end view of the rotor member of Figure 2, taken on line 3—3 of Figure 2.
Figure 4:
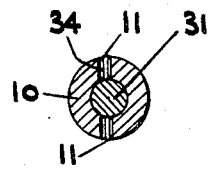
Figure 4 is a cross-sectional view taken on line 4—4 of Figure 1.

In various types of motor vehicles, such as diesel trucks, caterpillar tractors, and the like, it is necessary for the engine to operate at a fairly high speed before the load is applied. When the engine is running at low speed, as when it is idling, unsatisfactory performance will be obtained when load is applied, and the engine may be caused to stall unless some means is provided for withholding application of the load until a predetermined engine speed is reached. It is a prime purpose of the present invention to provide an automatic means for accomplishing the above function.

Referring to the drawings, 9 designates a shaft coupled to the main engine shaft, said shaft 9 carrying a gear 12. Meshing with gear 12 is a gear 13 carried at one end of a rotor member 14 which is rotatably and slidably mounted in a housing 15. Housing 15 includes an end compartment 16 and in this compartment is an end disc 17 carried by rotor 14. Bearing against rotor 14 axially thereof and rotatably with respect thereto is a coiled spring 18. The pressure on spring 18 may be adjusted by axially moving a rod member 19 which bears on the spring, said rod member being slidable in a recess 20 formed in compartment 16 and axially aligned with rotor 14. Rod member 19 is formed with rack teeth which are in mesh with a pinion 21 carried on a transverse shaft 22 journalled in the walls of compartment 16 and extending outside thereof. A handle 23 is provided on the external portion of shaft 22 for manually actuating pinion 21 to adjust the pressure on spring 18 as above described.

Pivotally secured to disc 17 at diametrically opposite positions thereon are a pair of bent lever members 24, 24 having weighted ends 25. The bent portions of members 24, 24 bear on an annular bearing washer 26 secured to the adjacent wall of compartment 16, said bent portions being rotatable with respect to said bearing washer 26 in accordance with the rotation of rotor member 14. Under low speed or idling conditions of the engine, rotor 14 will be in the position shown in Figure 1. When a predetermined high engine speed is reached the motor will be moved axially by the outward extension of weighted ends 25 acting on bent levers 24 by centrifugal force until said rotor assumes the position shown in Figure 5.

The aforementioned structure is associated with a transmission device comprising a housing 27 containing suitable transmission fluid.

The vehicle propeller shaft, designated at 28, is journalled at one end of housing 27 and is provided with a suitable fluid tight packing gland 29. Shaft 28 carries a fluid coupling rotor 30. Journalled in the other end of housing 27 is a shaft member 31, axially aligned with shaft 28 and carrying a fluid coupling rotor 32 opposing rotor 30 in housing 27. Shaft member 31 is axially slidable in its bearing so that the spacing between coupling rotors 30 and 32 may be varied. The outer end of shaft member 31 is slidably received in an axial recess 33 formed in the end of the main engine shaft 10, the shaft being slotted at 11, 11 adjacent recess 33 to receive a pin member 34 passing transversely through shaft member 31, whereby shaft 10 may transmit torque to shaft member 31 while permitting shaft member 31 to be shifted axially with respect to shaft 10.

Shaft member 31 is formed with a collar 35 which is engaged by a shifter rod member 36 formed with a bifurcated head 37 straddling said collar. The lower end portion of shifter rod member 36 is bent at right angles to the main portion, as shown at 38 and carries a plunger 39 slidably positioned in a fluid cylinder 40, portion 38 being slidable with respect to the end wall of cylinder 40 through which it passes but fluid-tight with respect thereto.

Figure 5:
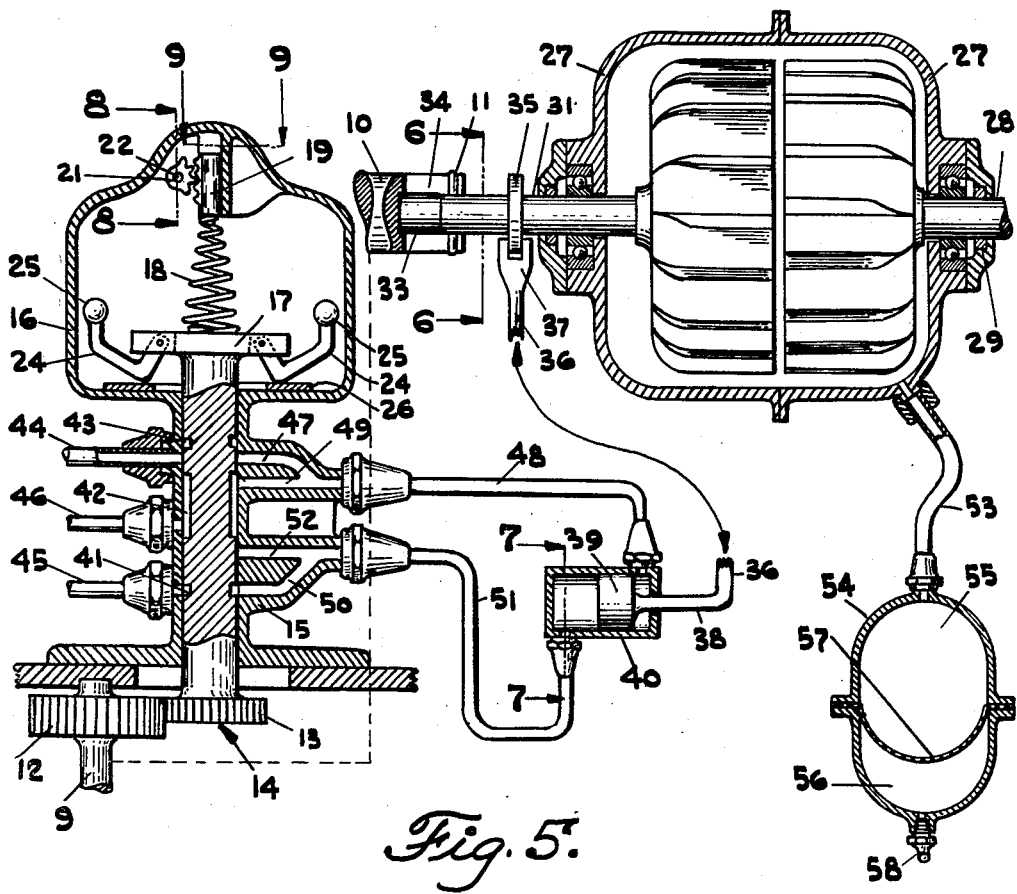
Figure 5 is a cross-sectional schematic view showing the structure of Figure 1 in high speed or full load position.
Figure 6:
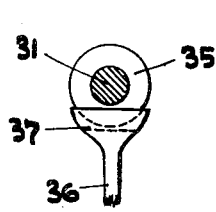
Figure 6 is a cross-sectional view taken on line 6—6 of Figure 5.
Figure 8:
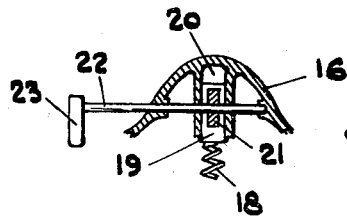
Figure 8 is a cross-sectional view taken on line 8—8 of Figure 5.
Figure 9:
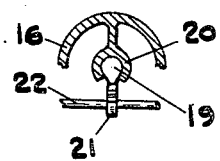
Figure 9 is a cross-sectional view taken on line 9—9 of Figure 5.
Figure 7:
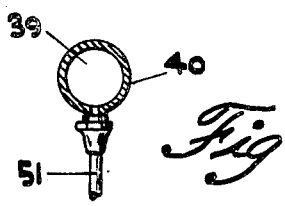
Figure 7 is a cross-sectional view taken on line 7—7 of Figure 5.

Rotor 14 is formed with a first annular groove 41, an intermediate reduced portion 42 and a second annular groove 43. Cnnected to housing 15 are fluid conduits 44 and 45 connected to a source of fluid pressure such as a fluid pump. Connected to said housing intermediate conduits 44 and 45 is a return conduit 46 connected to a suitable fluid reservoir. Return conduit 46 is in communication wtih reduced portion 42 of rotor 14 in all positions of said rotor. In the low speed position of said rotor, as shown in Figure 1, conduit 44 is in communication with groove 43. Registering therewith is a passage 47 formed in housing 15 and connected by a conduit 48 to the rearward end of cylinder 40. A return passage 49 connects conduit 48 to reduced portion 42 of rotor 14 when said rotor is in the high speed position, as shown in Figure 5.

In the high speed position of rotor 14 conduit 45 is in communication with groove 41. Registering therewith is a passage 50 formed in housing 15 and connected by a conduit 51 to the forward end of cylinder 40. A return passage 52 connects conduit 51 to reduced portion 42 of rotor 14 when said rotor is in the low speed position, as shown in Figure 1.

When the engine is running at low speed, as under idling conditions, fluid under pressure passing through conduit 48 into the rear end of cylinder 40 moves piston 39 forwardly causing shifter rod 36 to move shaft member 31 to a position wherein rotor element 32 is separated by a substantial spacing from rotor element 30. Under these conditions no torque is transmitted from engine shaft 10 to propeller shaft 28. This condition is illustrated in Figure 1. When the engine speed is increased, as where load is to be applied to the engine, rotor member 14 is shifted upwardly, as above described, and as the engine comes up to speed groove 41 is brought into registry with passage 50 and conduit 45 whereby fluid under pressure passes through conduit 51 into the forward end of cylinder 40. The piston 39 is moved rearwardly, the fluid behind said piston being discharged through conduit 48 to return conduit 46. The rearward motion of piston 39 moves shifter rod 36 and shaft member 31 rearwardly and brings rotor element 32 into closely spaced relationship to rotor element 30. Torque is now transmitted from engine shaft 10 to propeller shaft 28.

Connected by a conduit 53 to transmission housing 27 is a chamber 54 having an upper space 55 for displaced fluid from housing 27 and a lower air space 56, space 55 being separated from space 56 by an elastic diaphragm 57 of rubber or the like. A check valve 58 communicating with air space 56 is provided in the wall of chamber 54 whereby air under pressure may be pumped into air space 56. This arrangement permits the displacement of fluid from housing 27 when shaft member 31 is actuated and insures the return to said housing of displaced fluid when a stable condition has been reached.

While a specific embodiment of a governor to be associated with an automatic fluid transmission structure for vehicles has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

In combination, a governor controlled valve mechanism comprising a tubular housing, a rotor member disposed within the housing for rotative and axial movement therein, means connected to the rotor member for rotating the same, a casing secured at one end to one end of the tubular housing, a disc secured transversely to one end of the rotor member and mounted within the casing, bell crank levers having their inner ends pivoted to the disc and provided at their outer ends with weights, the bell crank levers bearing against the end of the casing, a coil spring disposed axially of the disc and engaging at one end with the disc to oppose the longitudinal movement of the rotor member, a plunger slidably engaging a part of the casing and engaging the opposing end of the spring and movable axially of the spring to regulate its tension, and means extending to the exterior of the casing to shift the plunger.

JAMES T. CROWDER.

REFERENCES CITED

The following references are of record in the file of this patent:

UNITED STATES PATENTS

| Number | Name | Date |
|---|---|---|
| 853,785 | Henry | May 14, 1907 |
| 959,471 | Dake | May 31, 1910 |
| 993,982 | Halliwell | May 30, 1911 |
| 1,718,673 | Wettstein | June 25, 1929 |
| 1,747,468 | Cowardin | Feb. 18, 1930 |
| 1,910,697 | Kiep | May 23, 1933 |
| 1,958,303 | Hayes | May 8, 1934 |
| 1,967,851 | Wilson | July 24, 1934 |
| 2,032,398 | Brady | Mar. 3, 1936 |
| 2,089,590 | Walti | Aug. 10, 1937 |
| 2,204,640 | Woodward | June 18, 1940 |
| 2,204,774 | Rusch | June 18, 1940 |
| 2,219,229 | Kalin | Oct. 22, 1940 |
| 2,363,952 | Fillmore | Nov. 28, 1944 |
| 2,371,793 | Bourland | Mar. 20, 1945 |
| 2,385,058 | Buthe | Sept. 18, 1945 |
| 2,397,213 | Smith | Mar. 26, 1946 |
| 2,463,495 | Rodeck | Mar. 1, 1949 |

FOREIGN PATENTS

| Number | Country | Date |
|---|---|---|
| 114,836 | Great Britain | of 1919 |